3,542,590
PROCESS OF EXTRACTING SUGAR FROM DRIED ALKALI METAL OR ALKALINE EARTH METAL SULFITE LYE RESIDUE
George Juri Paabo and Ants-Michael Uesson, Malmo, Sweden, assignors to Sydkemi Aktiebolag, Malmo, Sweden
No Drawing. Filed Jan. 10, 1968, Ser. No. 696,701
Claims priority, application Sweden, May 5, 1967, 6,348/67
Int. Cl. C13d 1/14
U.S. Cl. 127—44
3 Claims

ABSTRACT OF THE DISCLOSURE

A process of extracting from a powder of dried alkali metal or alkaline earth metal salt sulfite lye deriving either from hardwood or softwood, a sugar fraction to recover sugars present in the sulfite lye leaving a sugar-free residue in the original powder form. The extraction is carried out by gravity packing of an extractor with the powder plus a solvent, by circulating fresh solvent in a closed extractor system, and by removing impurities from the extract obtained by treatment with potassium carbonate.

---

This invention relates to a process of extracting dried alkali metal or alkaline earth metal salt sulfite lye containing sugar for the recovery of one or more sugars and a sugar-free nonhydroscopic residue of the sulfite lye.

The invention has for its object to reocver the sugars present in dried sulfite lye, leaving a sugar-free residue of lignosulfonic acid salts. Crystalline D-xylose can be obtained from the sugar fraction.

It is known that xylose can be extracted from dried hardwood sulfite lye by extraction with ethanol or methanol. However, the removal of sugars presents considerable practical difficulties in the extraction process, mainly because the sulfite lye powder tends to cake, thus making the extraction process time-consuming and difficult. The process according to the present invention is essentially characterised by the fact that the residue from the sulfite lye powder is recovered in the original form and does not require any further processing.

The extraction is performed in a jacketed vessel with a perforated bottom covered with a filtering surface while the extract is collected in a still and a fresh solvent or extracting agent from the distillation is circulated through the extraction vessel.

EXAMPLE I 50 g. of dried hardwood calcium salt sulfite lye were mixed with 250 ml. of absolute ethanol which can contain up to 6% methanol. The mixture was heated to 70° C. under stirring and then cooled to 30° C. The mixture was poured into an extraction vessel to settle by gravity (improper filling of the extraction vessel results in packing of the material and failure of the extraction).

The excess solvent (the extract) was run from the extractor through a filtering medium into a still to boil therein. The vapours were condensed in a vertical condenser and the solvent was run back into the extractor, where the layer of solids were kept covered with solvents during the time of the extraction. During the first hour of the extraction the temperature in the extractor was kept below 50° C. and then gradually increased to 65° C. The extraction was continued until the solvent running off from the extractor was completely colorless. Heating was discontinued and as much solvent as possible was run off from the extractor into the still.

The warm extract in the still pot was stirred for 15 minutes with 1-2 g. of powdered potassium carbonate which removed a greyish-brown material that would otherwise have crystallized together with the sugar xylose.

The sugar containing extract was cooled to room temperature and filtered. The filtrate was concentrated at atmospheric pressure to about ⅛ of its initial volume, whereupon the rest of the solvent was removed in vacuum.

The resulting brown residue amounting to 20 g. was dissolved in 60 ml. of methanol-free 95% ethanol, and xylose was crystallized by cooling the solution to 0° C. The crystals were filtered and washed with successive small amounts of 95% ethanol at 0° C. until the filtrate was colorless.

A second crop of crystals was obtained by concentrating the mother liquors to syrup form and cooling. The precipitated crystals were filtered and washed in the manner described above. This second crop amounted to 1.45 g. The total yield of xylose amounted to 6 g. which was approximately 60% of the xylose present in the hardwood sulfite lye powder used as starting material.

The mother liquors containing the remaining xylose and other sugars can be utilized in a known manner, for instance for the production of Torula yeast.

The solvent remaining in the extractor was recovered by keeping the extractor under partial vacuum for several hours.

After the extraction the solid calcium salt sulfite lye was still in powder form. As it was free-flowing it was poured out of the extractor. It was no longer hygroscopic.

EXAMPLE II 50 g. of spray-dried hardwood calcium salt sulfite lye were extracted in a manner corresponding to that in Example I, and the xylose was recovered. The ethanol was removed from the calcium salt sulfite lye residue and the material was extracted again in the same manner with methanol. The methanol extraction yielded an additional amount of 5 g. of extract. However, no xylose could be obtained from this fraction by crystallization.

EXAMPLE III 50 g. of the same material as in Example II were extracted with methanol in a manner corresponding to that of Example I, with the difference, however, that the mixture was preheated to 60° C. The total amount of material extracted was 23 g. After removal of methanol and dissolving the sugar containing residue in 95% ethanol, 3 g. of xylose were obtained as a first crop and an additional amount of 1.8 g. as a second crop, which gave a total yield of 4.8 g. of xylose. A very small amount crystallizes from the mother liquors after these had been left standing for two weeks.

EXAMPLE IV 50 g. of dried softwood calcium salt sulfite lye powder were mixed with 250 ml. of methanol, heated to 60° C. under stirring and cooled to 30° C. The mixture was transferred to the extractor and the extraction was continued according to Example I. After recovery of the solvent the extraction residue, which mainly consisted of hexoses and pentoses, amounted to 18–20 g. This sugar residue can be used in known manner such as for fractionation to isolate xylose or another sugar derivative, or for fermentation to produce alcohol or Torula yeast.

The residue from the sulfite lye powder which was of improved quality and nonhygroscopic was poured out of the extractor. It amounted to 30–32 g.

What we claim and desire to secure by Letters Patent is:

1. A process of extracting dried alkali metal or alkaline earth metal salt sulfite lye containing sugar for recovering one or more sugars and a sugar-free non-hygroscopic residue of the sulfite lye, comprising the steps of preheating the sulfite lye together with an extracting agent in the form of a water-free solvent to a temperature lower than the boiling point of the solvent, cooling the resulting mixture to 30° C. or less, and then introducing it into an extractor by gravity flow, completing in the extractor the extraction which was initiated in the preheating step by circulating fresh extracting agent in a closed system through the sulfite lye, stirring the warm sugar containing extract obtained, which has been separated from the extracted sulfite lye, together with potassium carbonate added for removing impurities therefrom, then cooling and filtering the sugar containing extract, freeing the resulting purified extract from the extraction agent and dissolving the sugar-containing residue obtained in alcohol, followed by treating the solution obtained for recovering the desired sugar or sugars, and, separately, freeing the extracted sulfite lye from the extraction agent for recovering the sugar-free non-hygroscopic residue of the sulfite lye.

2. A process as claimed in claim 1, wherein the extracting agent is selected from the group consisting of ethanol, methanol, and a mixture thereof.

3. A process as claimed in claim 2, wherein the sulfite lye is a hardwood sulfite lye and the sugar-containing residue is dissolved in 3–4 parts of methanol-free 95% ethanol whereupon the resulting solution is subjected to successive crystallizations for recovering crystalline xylose.

References Cited

UNITED STATES PATENTS 2,865,906   12/1958   Hoye _____ 260—124

OTHER REFERENCES

C. A. 54: 21754b (1960).

JOSEPH SCOVRONEK, Primary Examiner

S. MARANTZ, Assistant Examiner